(12) United States Patent
da Cruz Baptista

(10) Patent No.: US 11,202,458 B2
(45) Date of Patent: Dec. 21, 2021

(54) PRODUCE OIL EXTRACTION

(71) Applicant: John Bean Technologies Máquinas e Equipamentos Industriais Ltda., São Paulo (BR)

(72) Inventor: Luiz Ferndando da Cruz Baptista, Araraquara (BR)

(73) Assignee: JOHN BEAN TECHNOLOGIES MÁQUINAS E EQUIPAMENTOS INDUSTRIAIS LTDA, Araraquara (BR)

( * ) Notice: Subject to any disclaimer, the term of this patent is extended or adjusted under 35 U.S.C. 154(b) by 512 days.

(21) Appl. No.: 15/874,691

(22) Filed: Jan. 18, 2018

(65) Prior Publication Data

US 2019/0216116 A1 Jul. 18, 2019

(51) Int. Cl.
*A23L 27/12* (2016.01)
*A23N 15/00* (2006.01)
(Continued)

(52) U.S. Cl.
CPC .............. *A23L 27/13* (2016.08); *A23L 27/11* (2016.08); *A23N 15/00* (2013.01); *C11B 1/02* (2013.01);
(Continued)

(58) Field of Classification Search
CPC ........... A23N 7/02; A23N 15/00; A23L 27/11; A23L 27/12; A23L 27/13; C11B 1/02; C11B 1/06; C11B 1/10
See application file for complete search history.

(56) References Cited

U.S. PATENT DOCUMENTS

| 2,354,878 A | 8/1944 | Platt |
| 3,707,176 A | 12/1972 | Bushman |

(Continued)

FOREIGN PATENT DOCUMENTS

| CN | 104498187 A | 4/2015 |
| CN | 204752664 U | 11/2015 |

(Continued)

OTHER PUBLICATIONS

"More II: Modular Oil Recovery Extractor," JBT, Lakeland, Florida, Nov. 2014, 4-page brochure.
(Continued)

*Primary Examiner* — Steven N Leff
(74) *Attorney, Agent, or Firm* — Christensen O'Connor Johnson Kindness PLLC

(57) ABSTRACT

An oil recovery extraction system includes a feeding and weighing system to weigh fruit and feed the fruit to an oil recovery extractor; extraction rollers that perforate a surface of the fruit to allow oil to flow out from the surface into the emulsion extractor reservoir; and a fruit washing system to spray the fruit with potable water to wash oil remaining on the fruit after the fruit has left the oil emulsion extractor reservoir; wherein an oil-water emulsion from the oil emulsion extractor and an oil-water emulsion from the fruit washing system are combined into an oil-emulsion; and a process control system to measure and control operational parameters of the machine, including calculating a setpoint feed flow of the fruit, then measuring and controlling the feed flow of fruit based on the setpoint, and further calculating a setpoint flow of potable water, heavy phase, then measuring and controlling the flows.

20 Claims, 15 Drawing Sheets

(51) Int. Cl.
*C11B 1/10* (2006.01)
*A23L 27/10* (2016.01)
*C11B 1/06* (2006.01)
*C11B 1/02* (2006.01)

(52) U.S. Cl.
CPC .................................. *C11B 1/06* (2013.01); *C11B 1/10* (2013.01); *C11B 1/108* (2013.01); *A23V 2002/00* (2013.01)

(56) References Cited

U.S. PATENT DOCUMENTS

| | | |
|---|---|---|
| 3,952,647 A | 4/1976 | Holbrook et al. |
| 3,954,032 A | 5/1976 | Holbrook |
| 4,070,959 A | 1/1978 | Bushman et al. |
| 4,248,142 A | 2/1981 | McKinney, Jr. |
| 4,470,344 A | 9/1984 | Bushman |
| 5,826,496 A | 10/1998 | Jara |
| 6,426,107 B1 | 7/2002 | Thomas et al. |
| 7,316,181 B2 | 1/2008 | Augusto et al. |
| 2002/0061350 A1* | 5/2002 | Thomas .............. B24B 25/00 426/482 |

FOREIGN PATENT DOCUMENTS

| | | |
|---|---|---|
| CN | 107446703 A | 12/2017 |
| CN | 107574017 A | 1/2018 |

OTHER PUBLICATIONS

Utility Model Search Report received for Corresponding Turkish Patent Application No. 2019/00784, completed Oct. 9, 2020, 3 pages.

\* cited by examiner

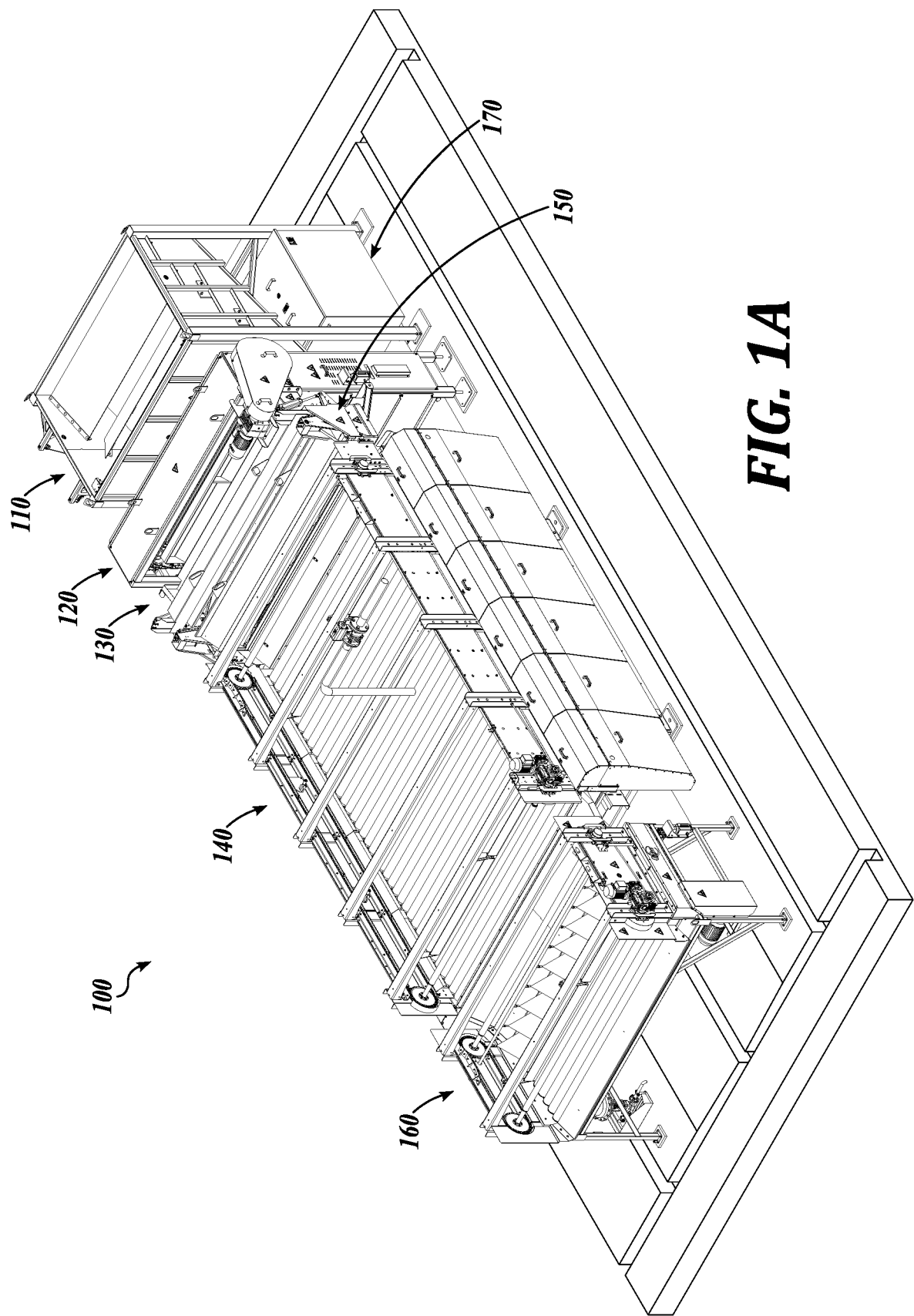

PRODUCE OIL EXTRACTION

BACKGROUND

U.S. Pat. No. 7,316,181 discloses a machine to extract oil from fruit. Although the machine described in the foregoing patent made significant improvements, there were still some disadvantages. For example, the capacity is simply the number of buckets per time, and multiplying this value by a coefficient to estimate the amount of mass contained in each bucket. As the fruit contained in the buckets changes, the weight changes too, therefore, the mass contained in each bucket changes. Further, the goal of the machine is to produce an oil-water emulsion within a certain concentration. The oil-water emulsion is sent to a centrifuge for further separation of the oil. However, the oil-water emulsion concentration is partly dependent on the actual capacity, but the prior art machine is hampered in not being able to determine the actual capacity.

Accordingly, it becomes difficult for an operator, even with working experience of the machine, to control the oil-water emulsion concentration to the centrifuge.

SUMMARY

Embodiments of the present produce oil extracting machine retain or improve upon some the prior noted advantages of the prior art machine. Such improvements and modifications are discussed herein. In an embodiment, the present oil extracting machine provides accurate control of the machine operating parameters to produce a reliable oil-water emulsion to a separator, such as a centrifuge. The improved process control system of the present machine eliminates the need for manual adjustment of the feeder, the extraction rollers, the heavy phase flow, and the potable water flow. In the present machine with the process control system, some data is input, and the machine can set the operational parameters: feeding rate, extraction rollers' rotational speed and axial speed, heavy phase flow, and potable water flow. The process control system of the present machine makes continuous adjustments in the operational parameters automatically. The advantage is an easier and more efficient process control, which will provide a better centrifuge efficiency and improve yield.

In addition to improving the process control of the foregoing operational parameters, a process control computer allows the automation of equipment sequences. For example, the following sequences can be automated using the process control system: the turn on sequence, the final process sequence, the process stop sequence, and the fruit removal sequence.

In an embodiment, an oil extraction system, comprises, a feeding and weighing system configured to weigh and feed fruit to an oil recovery extractor; the oil recovery extractor comprises a plurality of extraction rollers inside an oil recovery extractor reservoir, wherein the extraction rollers perforate fruit peel oil cells under water or a heavy phase to drain oil from the oil cells; and a fruit washing system configured to spray the fruit with potable water to wash oil remaining on the perforated fruit peel after the fruit has left the oil recovery extractor and collect the oil; wherein an oil-water emulsion from the oil recovery extractor and an oil-water emulsion from the fruit washing system are combined into an oil-emulsion inside an oil emulsion tank to produce a product having an oil percent that is an ideal concentration to maximize the oil recovery yield in a centrifuge; and a process control system configured to control the capacity according to fruit conditions and default values for non-inputted parameters or according to production request and to measure and control one or more operational parameters of the machine including calculating a setpoint feed flow of the fruit, then measuring and controlling the feed flow of fruit based on the setpoint or according to production necessity.

In an embodiment, the process control system is further configured to calculate operational parameters that produce an oil-emulsion product having an oil percent that is an ideal concentration to maximize the oil recovery yield of the centrifuge.

In an embodiment, the process control system is configured to maximize oil recovery yield and control the capacity.

In an embodiment, the process control system is configured to recalculate the operational parameters repetitively.

In an embodiment, the process control system is configured to increase the feed flow to the machine when the feed flow to the machine is equal to or less than the setpoint feed flow.

In an embodiment, the oil extractor machine receives a heavy phase of an oil-water emulsion from a separator, and the process control system is configured to further calculate a setpoint of the heavy phase flow to the emulsion tank.

In an embodiment, the process control system is configured to increase the heavy phase flow to oil extractor machine when the flow of heavy phase is equal to or less than the setpoint flow of the heavy phase.

In an embodiment, the fruit washing system receives potable water, and the process control system is configured to further calculate a setpoint of the potable water flow to the fruit washing system.

In an embodiment, the process control system is configured to increase the flow of the potable water to the fruit washing system when the flow of potable water to the fruit washing system is equal to or less than the setpoint flow of the potable water.

In an embodiment, the oil extraction system comprises extraction rollers located inside the oil recovery extractor reservoir, wherein the extraction rollers are configured to rotate at a rotational speed around a longitudinal axis while reciprocating back and forth at an axial speed along the longitudinal axis.

In an embodiment, the process control system is configured to calculate the rotational speed and the axial speed of the extraction rollers based on at least fruit physical parameters.

In an embodiment, the extraction rollers are grouped into modules and each module comprises more than one extraction roller operating at a different rotational speed than the other extraction rollers in the same module.

In an embodiment, the extraction rollers of each module are assigned a position, and the extraction rollers at the same position of each module operate at the same rotational speed.

In an embodiment, the axial speed of each extraction roller is the same.

In an embodiment, the process control system comprises a memory having look-up tables to calculate the setpoints for the operational parameters.

In an embodiment, the oil extraction system further comprises a debris removal system having a rotating scoop configured to remove fruit debris from the oil extractor reservoir.

In an embodiment, the feeding and weighing system includes a first bin having a first rotating floodgate to feed fruit to a second bin, wherein the second bin has a second rotating floodgate to feed fruit to the oil recovery extractor, and the second bin has a load cells to measure weight of fruit in the second bin, wherein the process control system is configured to receive the weight from the second bin and open and close the floodgates.

In an embodiment, a method for extracting oil from fruit, comprises, calculating values of one or more operational parameters of an oil extraction system, the machine comprising: a feeding and weighing system configured to weigh and feed fruit to an oil recovery extractor on a weight per time basis; the oil recovery extractor comprises a plurality of extraction rollers that perforate fruit peel oil cells under water or heavy phase to drain oil from the oil cells inside the oil recovery extractor reservoir; and a fruit washing system configured to spray the fruit with potable to wash oil remaining on perforated fruit peel after the fruit has left the oil recovery extractor and to collect the oil-water emulsion; wherein an oil-water emulsion from the oil recovery extractor and an oil-water emulsion from the fruit washing system are combined into an oil-water emulsion inside an oil emulsion tank to produce an oil percent that is an ideal concentration to maximize oil recovery yield of a centrifuge or according to production necessity; and measuring one or more operational parameters of the machine, and controlling the one or more operational parameters based on the calculated values.

In an embodiment, the method further comprises calculating the fruit feed flow to the machine, and controlling the fruit feed flow and based on the calculated value, calculating potable water flow and heavy-phase flow to keep the emulsion at the ideal concentration to maximize the centrifuge oil recovery yield.

In an embodiment, the method further comprises calculating a rotational speed and axial speed of extraction rollers that perforate the fruit peel oil cells to allow oil to flow out from the surface into the oil recovery extractor reservoir.

In an embodiment, the method further comprises calculating a flow of a heavy phase oil-water emulsion to the emulsion tank and measuring and controlling the flow of the heavy phase oil-water emulsion based on the calculated flow of heavy phase oil-water emulsion.

In an embodiment, the method further comprises calculating a potable water flow to the washing system to wash oil remaining on the fruit after the fruit passes from the emulsion tank and measuring and controlling the flow of potable water to the washing system based on the calculated potable water flow.

In an embodiment, the process control system is further configured to calculate operational parameters that produce an oil-emulsion with an oil percent that is the ideal concentration to maximize oil recovery yield of the centrifuge or according to production necessity.

In an embodiment, the operational parameters are calculated repetitively on a process control computer.

In an embodiment, the process control computer includes a theoretic curve that provide the calculated values of feed flow, heavy phase flow, and potable water flow.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a diagrammatical illustration of one embodiment of a modulating oil recovery and extraction machine;

DETAILED DESCRIPTION

Figure 1B:
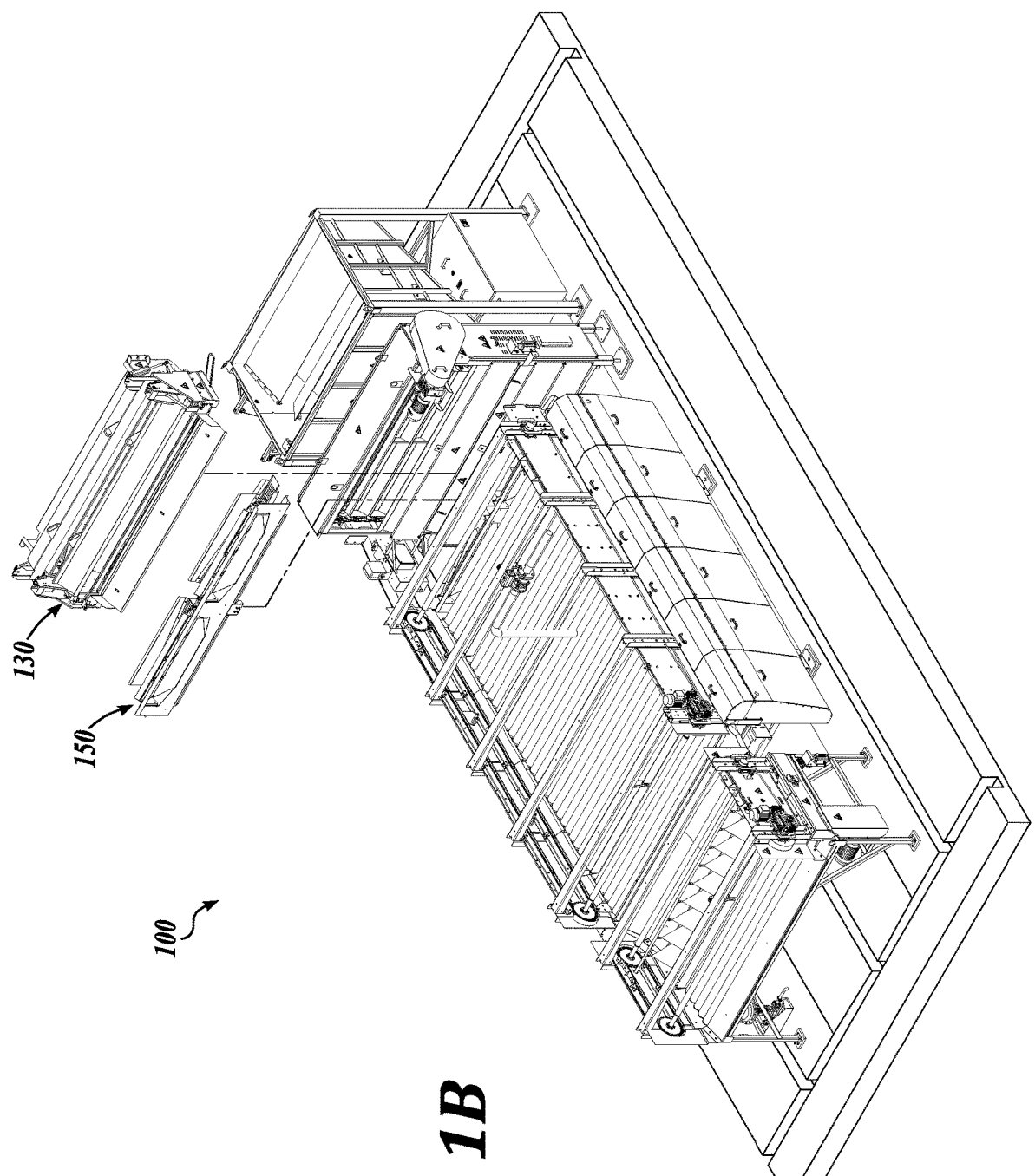
FIG. 1B is a diagrammatical illustration of a modulating oil recovery and extraction machine of FIG. 1A showing in exploded view two particular systems, the feeding and weighing system and the debris removal system.

Referring to FIGS. 1A and 1B, a modular oil recovery extractor (MORE) system 100 (hereafter "machine") is illustrated. Some of the relevant differences between the machine 100 illustrated in FIGS. 1A and 1B as compared to the machine of U.S. Pat. No. 7,316,181 will be described in further detail herein. In particular, the present disclosure relates to a process control system that can optimize the operational parameters to attain higher capacity, a higher yield, and be more efficient than prior art machines.

The machine 100 is for the extraction and recovery of oils from citrus peel. Produce includes, but is not limited to, for example, citrus fruits, such as limes, lemons, oranges, and all the variations thereof. In particular, the machine 100 has application for the extraction of oils from the peel, skin, or rind of produce, citrus fruits, and the like. Representative examples to describe the machine 100 and its operation may refer to fruit.

Referring to FIG. 1A, the machine 100 can be divided into sections according to the particular tasks for which they are designed. The machine 100 includes a surge bin 110, a bucket elevator 120, a weighing and feeding system 130, an oil recovery extractor 140, with a debris removal system 150, a fruit washing system 160, and an oil emulsion tank 170. Referring to FIG. 1B, the weighing and feeding system 130 and the debris removal system 150 are shown exploded from the drawing.

The entirety of the machine 100 need not be described herein as one may reference the above mentioned patent. In general, however, machine's 100 surge bin 110 and a bucket elevator 120 can be of conventional design. The surge bin 110 can be for the bulk storage of produce to be processed by the machine 100, and the bucket elevator 120 ("feeder") carries the produce from the surge bin 110 to the feeding and weighing system 130. The machine's 100 oil recovery extractor 140 includes a reservoir to hold the oil-water emulsion and a plurality of extraction rollers. The oil recovery extractor 140 is supported on any suitable structure in which there can be supported the reservoir and the inside it the extraction rollers. The extraction rollers rely on a transmission system formed by sprockets, chains, cam follower arms, and crank handles, for example, all operated by one or more motors. The transmission set transmits rotational and alternated axial movement to the plurality of extraction rollers, to be described in greater detail below in association with FIGS. 5 and 6. The extraction rollers are responsible for the extraction of the oil from the produce.

The whole set of extraction rollers and supporting axles are located over oil recover extractor 140. FIG. 1A shows an upper view of the oil recover extractor 140, which is provided with sets of spraying nozzles appropriately positioned at spaced intervals. The oil recovery extractor 140 is surrounded by side walls to retain the collected oil-water emulsion inside the reservoir and discharge the oil-water emulsion to an outlet. The oil recover extractor 140 can have a slight inclination towards a spillway for the oil-water emulsion at the end opposite from the feeding and weighing system 130. The spillway at the end of the oil recovery extractor 140 below the feeding and weighing system 130 can be equipped with cut-outs through which the oil-water emulsion will drop towards the collecting and transfer oil emulsion tank 170.

A discharge outlet may be placed at the low point of the oil recovery extractor 140 for cleaning or draining.

The washing system 160 is mounted over any suitable supporting structure and includes an inlet ramp to guide produce which has just passed over the extraction rollers. In the washing system 160, the produce first passes over a set of grooved rollers while being sprayed with potable water. The purpose of the first set of grooved rollers is to provide for washing of the produce from which the oil has been extracted and for further removing remaining oil on the surface of the produce. Then, a second set of flat rollers dry the produce surface after washing by the first set of rollers. The produce is then discharged over the outlet chute. Both the first and the second sets of rollers are located inside a tank provided with an oil-water emulsion discharge. Also, both the first and second roller sets are provided with rotational movement via a motor.

In the machine 100 of the present disclosure, the machine 100 further includes a control system including software and hardware components to improve among other things, the overall performance, efficiency, and consistency of product from the machine 100. In an embodiment, the machine 100 produces an oil-water emulsion, which is then fed to rotary sieve (paddle finisher or similar), and then centrifuges (separator first stage, and separator second stage) for further separation of the oil from the water. The centrifuge and equipment to support the auxiliary operations of the machine 100 are not shown or particularly described.

Figure 2:
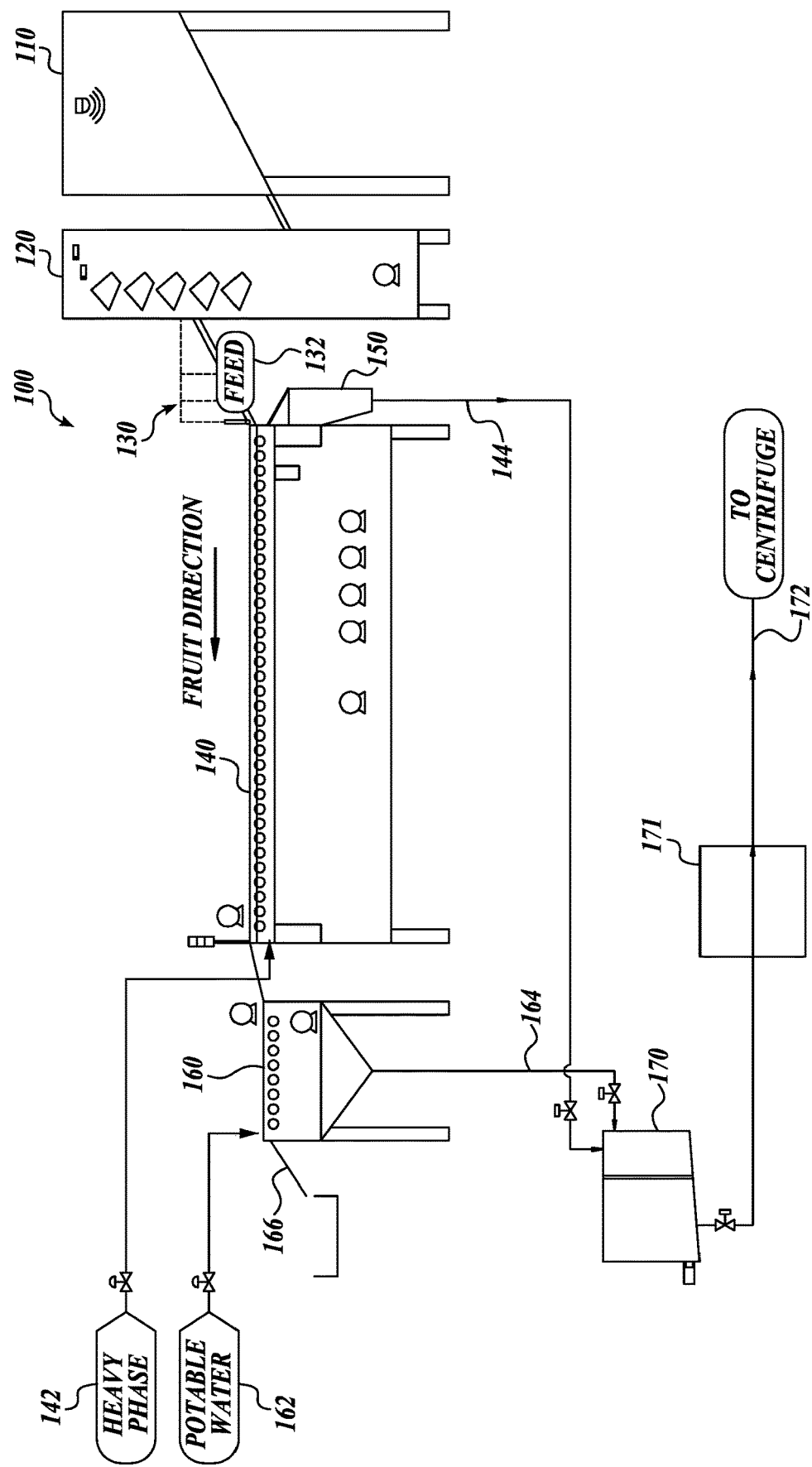
FIG. 2 is a schematic illustration showing the flows to and from the modulating oil recovery and extraction machine of FIG. 1.

FIG. 2 shows a schematic illustration of the machine 100 and the flows into and out of the machine 100. Not all flows are represented. For example, the machine 100 can have a dedicated fill line to the oil recovery extractor from a potable water source, a clean-in-place (CIP) system of pipes for water, steam, or drains, as required. Particularly, FIG. 2 is intended to show the main flows into and out of the machine 100 that are controlled, monitored, or verified by the control system. The flows into the machine 100 include the raw feed 132 (e.g. fruits), potable water 162 to the fruit washing system 160, heavy phase flow 142 from a centrifuge (not shown) into the oil recovery extractor 140. The heavy phase flow 142 is a return flow of oil-water emulsion from the centrifuge. The flows out of the machine 100 include an oil-water emulsion 164 from the fruit washing system 160 and oil-water emulsions 144 from the oil recovery extractor 140. The oil-water emulsion 164 from the washing system 160 and the oil-water emulsion 144 from the oil recovery extractor 140 are combined in a tank 170. From the tank 170, the oil-water emulsion is treated by device 171, which can be a paddle finisher, a rotary sieve, or the like, before being sent to the separator centrifuge. After processed in machine 100, the produce from the outlet chute 166 is sent to further processing. Debris from the oil recovery extractor 140 is removed by the debris removal system 150.

Figure 5:
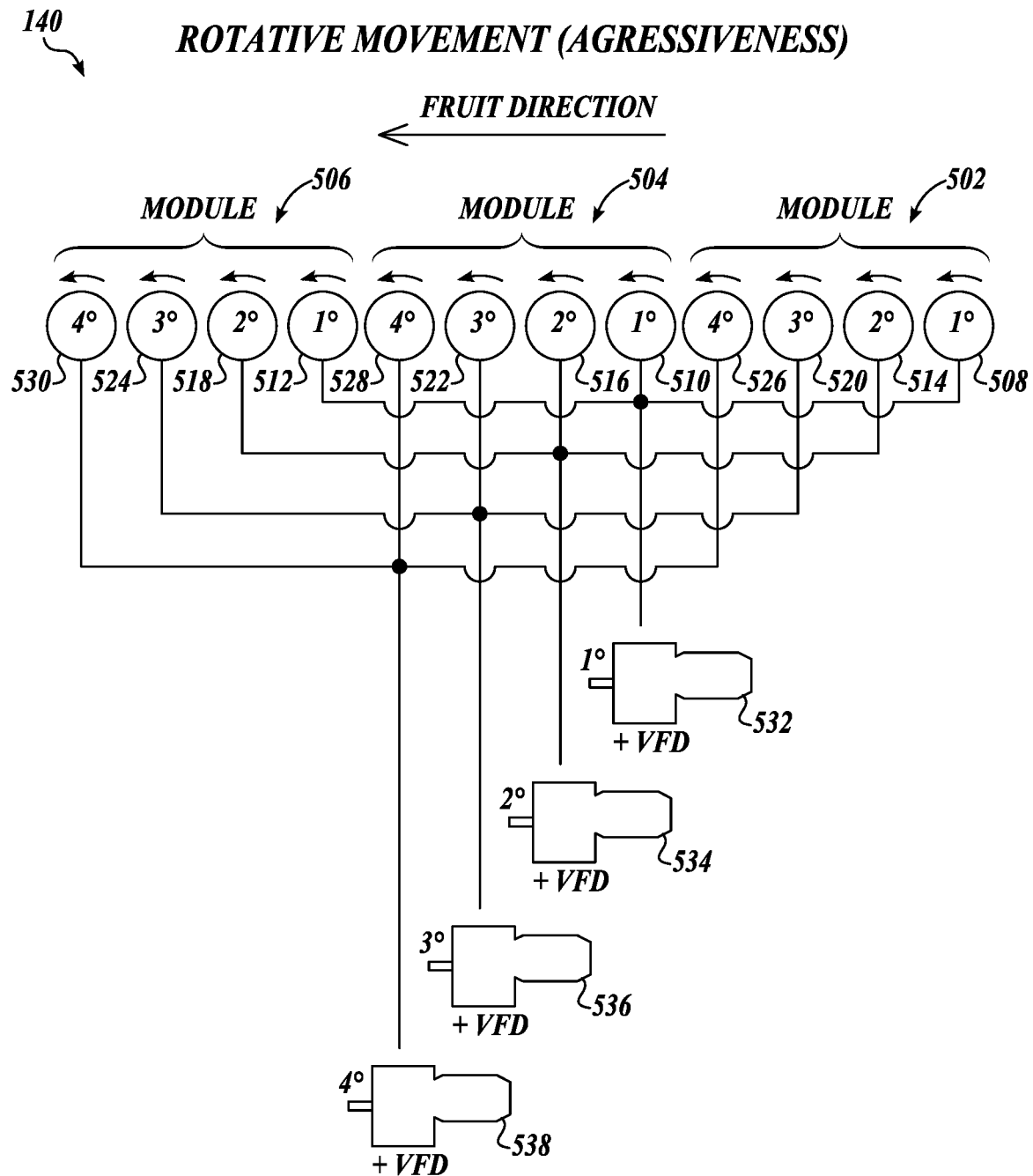
FIG. 5 is a diagrammatical illustration showing the rotational speed control of the extraction rollers of the modulating oil recovery and extraction machine of FIG. 1A.

In an embodiment, the machine 100 is controlled to produce an oil-water emulsion 172 to a separator centrifuge at the ideal concentration to maximize centrifuge oil recovery yield. In an embodiment, the desired oil-water emulsion composition is achieved by measuring and controlling the following flows to the machine 100: the feed flow 132, the heavy phase recycle flow 142, and the potable water flow 162. In addition to controlling the foregoing flows, the machine 100 also controls the rotational speed and axial speed of the extraction rollers in the oil recovery extractor system 140. In an embodiment, extraction rollers are a series of cylindrical rollers having a piercing surface. Extraction rollers can have thousands of little blades to perforate the peel's oil cells. Extraction rollers are arranged parallel to one another. Extraction rollers almost span the width of the oil recovery extractor 140. In an embodiment, a set of four extraction rollers are formed into one module, and the oil recovery extractor 140 can have a plurality of ten modules (FIG. 5). However, the invention is not limited neither to the number of extraction rollers in a module nor the number of modules in the oil recovery extractor 140. The embodiments described herein of the extraction rollers serve as a representative example. The operational control of the extraction rollers is described in terms of RPM (revolutions per minute) and axial speed (in strokes per minute).

Information input to the machine's 100 control system to control the settings of the extraction rollers RPM and axial speed include fruit physical parameters, including, but not limited to the fruit type, fruit variety, the amount of oil in fruit, fruit longitudinal diameter, fruit equatorial diameter, state of maturation (i.e., hard or soft). Among controlling other processes, the machine 100 calculates the theoretical capacity, sets elevator 120 speed to feeding system 130, weighs produce in the feeding system 130, sets flows 142 and 162, and sets rotation (aggressiveness) and axial speed of the extraction rollers. However, in other embodiments, the computation of the RPM and axial speed may consider additional variables.

From the foregoing description, in one embodiment, the process control system is described that calculates, then measures and controls at least the operational parameters including the potable water flow 162 to the fruit washing system, 160, the heavy phase flow 142 to the oil recovery extractor 140, and the feed flow 130 of produce to the oil recovery extractor 140. For example, according to a calculated capacity, the amount of oil in the fruit, the oil recovery yield, the percentage of oil in the heavy phase, and the flow of potable water, the process control system calculates the heavy phase flow 142, inlet potable water 162, to keep the oil-water emulsion 172 in the centrifuge at the ideal concentration. Then, the process control system gives instructions to achieve the calculated flows by actual measurement or inferred means.

Figure 3:
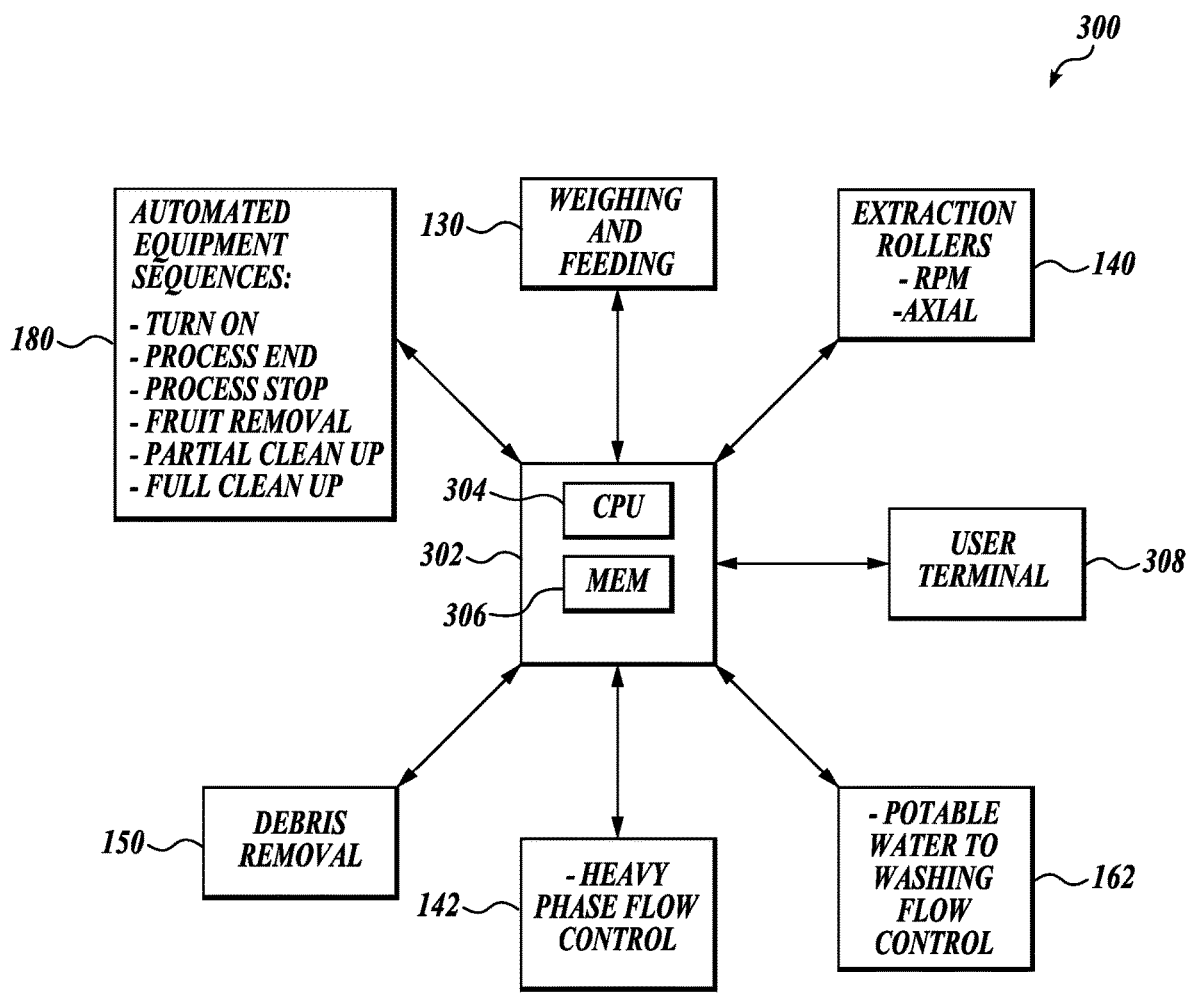
FIG. 3 is a diagrammatical illustration of the process control system for the modulating oil recovery and extraction machine of FIG. 1A.

FIG. 3 shows a diagrammatical illustration of a control system 300. Control system 300 may be implemented as a combination of hardware, software, and firmware. For example, the functional blocks of the control system method (shown in FIG. 4) may be implemented as software instructions executing on one or more central processing units. In some embodiments, a portion of the functional units may be implemented as hardware logic, for example, an application specific integrated circuit. In some embodiments, the control system 300 includes both hardware and software logic. The operation of control system 300 is described herein.

The control system 300 includes a process control computer 302. The process control computer 302 includes at least a central processing unit 304 and a memory 306. The one or more central processing units 304 can access the memory 306 to call up the look-up tables when carrying out the functional blocks to perform the calculations described herein. Information from the various instruments on the machine 100 providing the current status of the flows and weights, for example, can also be temporarily or permanently stored in the memory 306. The memory can further include a read only memory (ROM), random access memory (RAM). The memory stores a series of program modules comprising executable steps to perform the functions to operate the machine 100. FIG. 3 shows that the process control computer 302 can communicate, either through wires or wirelessly, to receive inputs and send outputs to control the weighing and feeding system 130, the emulsion tank 140 extraction rollers, the potable water flow 162, and the heavy phase flow 142. The control system 300 further includes a user terminal 308. The user terminal 308 includes one or more input device, such as but not limited to a keyboard, touchscreen, mouse, scanner, and the like. The user terminal 308 allows the operator of the machine 100 to input any further information or to change inputs or settings. The control system 300 also sends control instructions to the debris removal system 150, and for automatic operation of the turn on sequence, the final process sequence, the process stop sequence, and the fruit removal sequence, listed in operational block 180.

Figure 4:
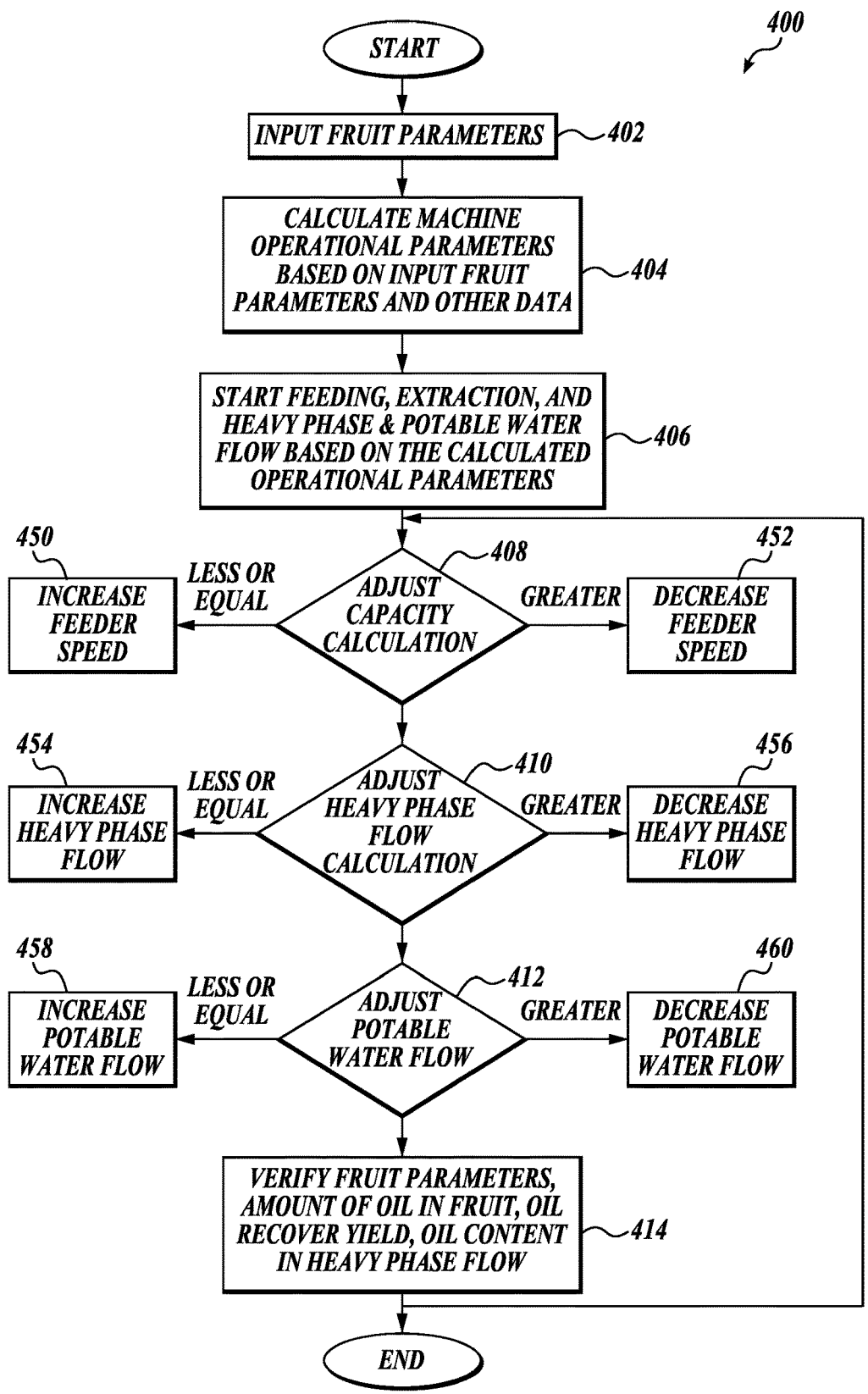
FIG. 4 is a schematic flow diagram showing the process control for modulating oil recovery and extraction machine of FIG. 1A.

With reference to FIG. 4, a description of the process control method of the machine 100 will be described. Prior to starting the machine 100, it is to be understood that the levels in the oil recovery extractor 140, the surge bin 110, and any other auxiliary equipment is in a ready to start condition.

Referring to FIG. 4, in functional block 402, the machine operator through the terminal 308 inputs the fruit parameters, such as type of fruit, the equatorial fruit diameter, the longitudinal fruit diameter, the amount of oil in fruit, state of maturation (i.e., hard or soft), and other variables, machine can use default values (oil in heavy phase, oil yield recovery, etc.).

From functional block 402, the method for control of the machine 100 enters functional block 404. In functional block 404, the process control computer 302 calculates certain machine 100 operational parameters, each operational parameter being based on one or more of the fruit input parameters. The computer calculated operational parameters include, but are not limited to capacity, extraction roller RPM, extraction roller axial speed, heavy phase flow to oil recovery extractor 140, and potable water flow to washing system 160. The machine operator can accept the computer calculated operational parameters, or at any time, the machine operator can override any one or more of the calculated operational parameters and enter the value of the operational parameter.

FIG. 4 is a flow diagram for use in a description of the process control method of machine 100. Prior to starting the machine 100, it is necessary to have minimum heavy phase levels in the oil recovery extractor reservoir 140, a minimum level of fruits in the surge bin 110, and all equipment is ready in the start conditions to ensure safety and to begin processing.

Referring to FIG. 4, in functional block 402, the machine 100 operator through the terminal 302 inputs the fruit parameters, such as type of fruit, equatorial fruit diameter, longitudinal fruit diameter, amount of oil in fruit, state of maturation (i.e., hard or soft), and other process variables. Alternatively, the process control system of the machine 100 will use default values for any that are non-inputted (for example, oil in heavy phase, oil yield recovery, etc.).

Figure 6:
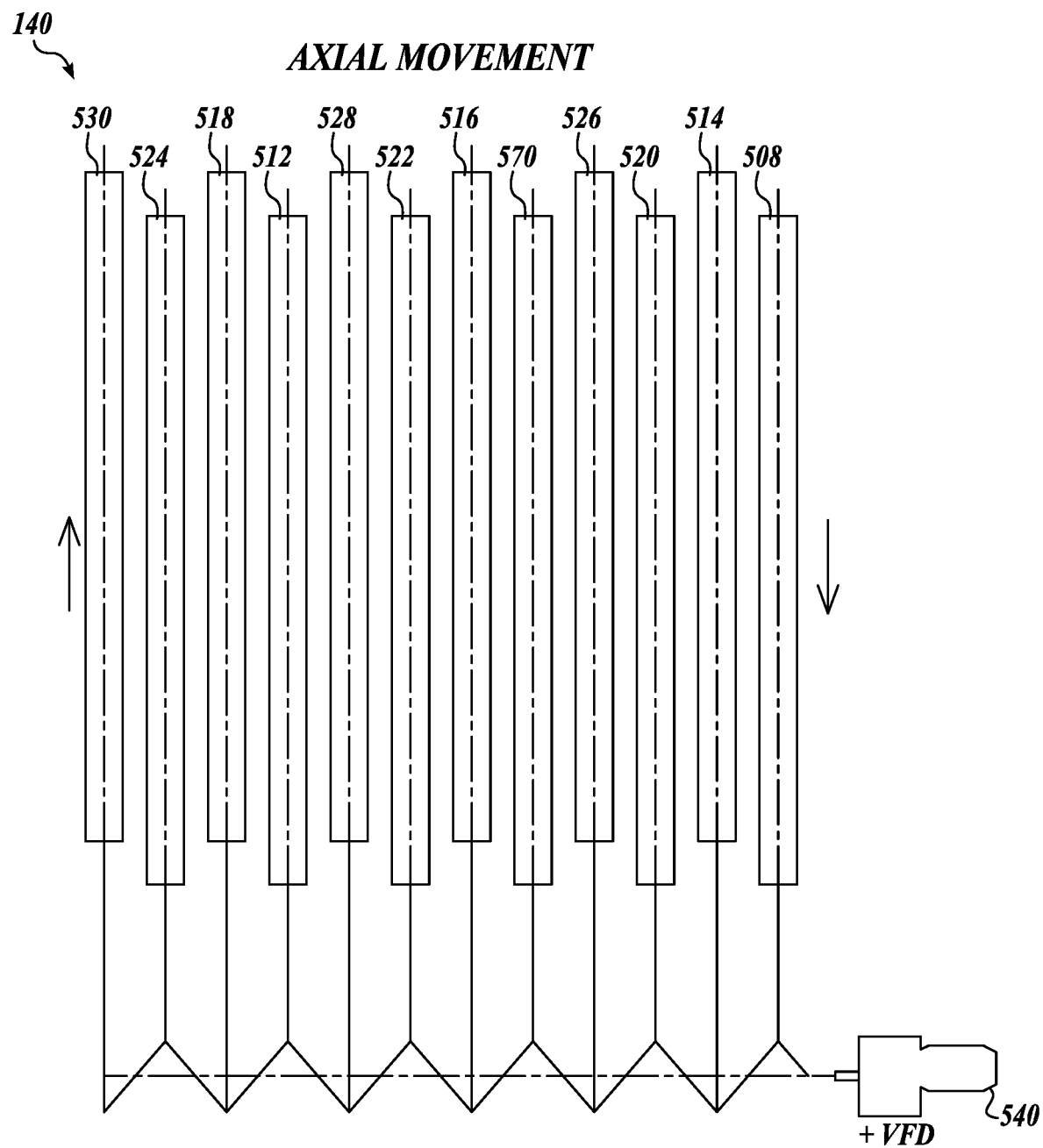
FIG. 6 is a diagrammatical illustration showing the axial speed control of the extraction rollers of the modulating oil recovery and extraction machine of FIG. 1A.

In the block 404, the machine 100 is ready to start with operator inputted parameters 402 and default values for all non-inputted values. Using these values, the process control computer 302 calculates certain machine 100 operational parameters, each operational parameter being based on one or more of the fruit inputted parameters and default values for all non-inputted values. The computer calculates, for these inputted values, operational theoretical parameters including capacity (120, FIG. 2), heavy phase flow (142, FIG. 2), potable water flow (162, FIG. 2), selects the theoretical extractor roller rotation set (FIG. 5), and selects the theoretical extractor roller axial speed grade (FIG. 6).

In bock 406, the machine 100 is ready to start, and the process control computer 302 has calculated and selected according to the fruit inputted parameters and the default values for all non-inputted values, the operational theoretical parameters (capacity, heavy phase flow, potable water flow, extractor roller set of rotation and extractor roller axial speed grade). The machine 100 starts feeding by the bucket elevator 120 and starts the weighing and feeding system 130 to the oil recovery extractor 140.

In block 408, the machine 100 is in capacity loop control. The capacity is calculated according to fruit conditions, and to keep this value, the weighing and feeding system 130 weighs the fruit batch before sending it to be processed in the oil recovery extractor 140. Then, this value is compared with the calculated value and the bucket elevator 120 has its speed increased in step 450, or decreased in step 452, to keep the outlet fruit capacity at a setpoint. The setpoint is generally the calculated value of the capacity feed flow. The loop control 408 adjusts the capacity continuously, according to inputted fruit conditions.

In block 410, the machine 100 is in heavy phase flow loop control. The heavy phase flow is calculated according to the fruit conditions, and to keep this value, the flow meter 142 measures the heavy phase flow. This value is compared with the calculated value and the control valve opens to increase the heavy phase flow in step 454 or closes to decrease the heavy phase flow in step 456 to keep the heavy phase flow at a setpoint. The setpoint is generally the calculated value of the heavy phase flow. The loop control 410 adjusts the heavy phase flow continuously according to the inputted fruit conditions.

In block 412, the machine 100 is in potable water flow loop control. The potable water flow is calculated according to the fruit conditions, and to keep this value, the flow meter 142 measures the potable water flow. This value is compared with the calculated value and the control valve opens to increase the potable water flow in step 458 or closes to decrease the potable water flow in step 460 to keep the potable water flow at a setpoint. The setpoint is generally the calculated value of the potable water flow. The loop control 410 adjusts the potable water flow continuously according to the inputted fruit conditions.

The functional block 414 is for laboratory analysis data entry (for example, the amount of oil in fruit, oil recovery yield, percent of oil in heavy phase), according to the analyzed fruit sample. The laboratory technician can input these data by terminal 308 or the machine 100 operator can input these data by the control system 302. Then, the process control computer 302 calculates, according to the analyzed fruit sample data and all the other unchanged values, the new operational theoretical parameters including capacity (120, FIG. 2), heavy phase flow (142, FIG. 2), potable water flow (162, FIG. 2), selects the theoretical extractor roller set of rotation (FIG. 5), and selects the theoretical extractor roller axial speed grade (FIG. 6).

The calculation processing and control looping done by process control computer 302 is running continuously to maximize the oil recovery yield.

At any time however, the machine 100 operator can add new values, input the extractor roller rotation set, input the axial speed grade (fruit condition process adjust improvement), and adjust the capacity or flows according to production necessity. When the machine 100 operator changes the calculated capacity, heavy phase flow, or potable water flow to the inputted value, the process control computer 302 will adjust the process for this forced condition, but the machine 100 may lose the maximum oil recovery yield, so as to work according to production necessity.

The capacity, heavy phase flow, and potable water flow calculation are done using a theoretical curve based on the particular machine and other factors, and the extractor roller rotation sets and axial speed grades are chosen based on the particular machine and other factors, including but not limited to fruit parameters, process conditions, and the machine.

FIG. 5 is a schematic illustration to explain the extraction rollers rotary system, which controls extraction rollers rotary movement. The extraction rollers are located under the oil emulsion extractor reservoir 140. The extraction rollers run under water or the heavy phase, and their function is to perforate the fruit peel oil cells under water or the heavy phase to drain the oil from oil cells.

The rotary system drives the extractor rollers which are driven by four gear motors, each one of them having one variable speed drive (VFD).

There are four extractor rollers for one speed module, and a plurality of ten modules in the machine 100. The fruit flows from extractor rollers from first to fourth, and successively, from the first to tenth module.

Each module of extractor roller includes:

First extractor roller 508, 510, 512, etc., of each module is driven by first gear motor 532.

Second extractor roller 514, 516, 518, etc., of each module is driven by second gear motor 534.

Third extractor roller 520, 522, 524, etc., of each module is driven by third gear motor 536.

Fourth extractor roller 526, 528, 530, etc., of each module is driven by fourth gear motor 538.

The fruit flows from extractor roller one to four and the extractor roller one is faster than extractor roller two, the extractor roller two is faster than extractor roller three, and the extractor roller three is faster than extractor roller four, and this speed pattern repeats successively. The speed difference from one extractor roller and the next one is the aggressiveness.

The aggressiveness setting is chosen according to the fruit by the process control computer 302 by controlling the VFD of the first gear motor 532, the VFD of the second gear motor 534, the VFD of the third gear motor 536, and the VFD of the fourth gear motor 538.

Based on testing and experimentation, aggressiveness settings for many types, varieties, and conditions of fruits can be developed to adjust the machine according to process conditions.

Referring to FIG. 6, a schematic illustration of the extraction rollers from FIG. 5 is shown in plan view to explain the axial speed control configuration. The axial movement tips the fruit in all directions to allow to process all peel surface.

The extractor rollers 508, 510, 512, 514, 516, 518, 520, 522, 524, 526, 528, and 530 are driven by cam follower arm shafts. The cam follower arm shafts are driven by connecting rods. The connecting rods are driven by crank handles. The crank handles are driven by the axial drive shaft. The axial drive shaft is driven by a gear motor that has one variable speed drive (VFD) 540. The mechanical linkages are assembled in such a way that the direction of travel of adjacent extractor rollers is staggered so that if one roller is traveling from right to left, the adjacent rollers are traveling left to right. The mechanical system of linkages to achieve such alternating travel directions is not particularly limited to one design.

The grades of axial speed control are chosen according to the fruit characteristics by the process control computer 302 and the speed is controlled by one driver, such as VFD gear motor 540.

Based on testing and experimentation, the grades of axial speed control can be developed for many types, varieties, and conditions of fruits to adjust the machine according to process conditions.

Figure 7:
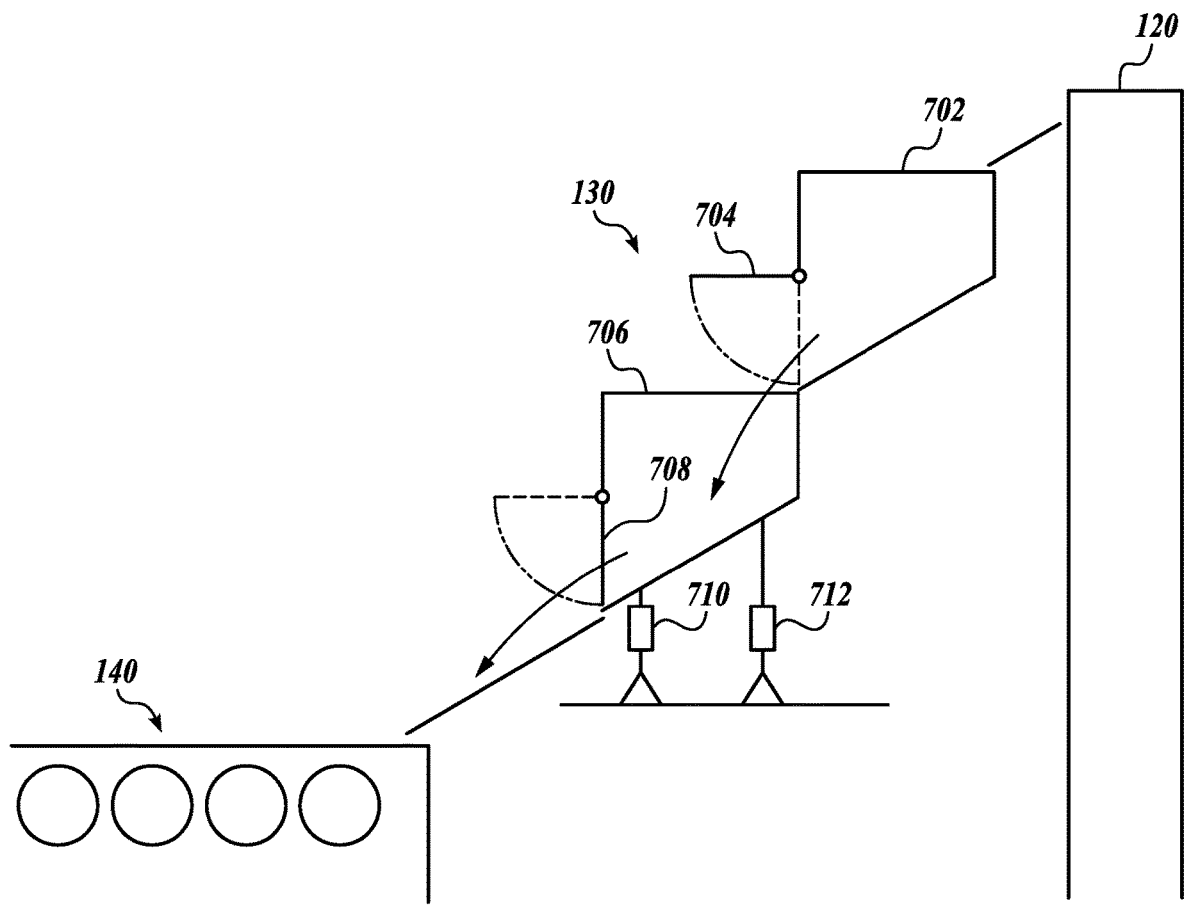
FIG. 7 is a diagrammatical illustration showing the feeding and weighing system of the modulating oil recovery and extraction machine of FIG. 1A.

FIG. 7 is a schematic illustration of feeding and weighing system 130 bins to explain the operation of the weighing and feeding system 130. As described, the weighing and feeding system 130 feeds fruit to oil recovery extractor 140 on a weight per time basis to meet a calculated capacity. It is to be appreciated that FIG. 7 represents one suitable embodiment of feeding fruit on a weight per time basis, as other feeding configurations are also within the scope of the disclosure.

In one embodiment, the feeding and weighing system 130 includes two bins 702 and 706. First Bin 702 receives and stores a quantity of fruit and at a certain time floodgate 704 is rotated to the open position to send its contents to the second bin 706. Second bin 706 is for weighing the amount of fruit. Bin 706 receives the fruit stored in the bin 702, waits for a time to stabilize, weighs the fruit, and then opens (pivots) the floodgate 708 to send the fruit down ramp 709 into oil recovery extractor 140. After bin 706 delivers the fruit to the oil recovery extractor 140, the floodgate 708 closes, and the next cycle starts.

Upper bin 702 receives fruit, for example, from a feeder mechanism, such as the bucket elevator system 120. The feeder that carries the fruit is synchronized to operate with the bins 702 and 706. Bins 702 and 706 can have a sloping or slanting bottom piece or floors that slants in the direction desired for fruit to travel. In this instance, bin 702 bottom slants toward the top opening of the lower bin 706, and the slanting bottom of bin 706 slants toward the oil recovery extractor 140. Because of the slanting bottom, bins 702 and 706 have a deeper side and a shallower side. In both bins 702 and 706, the shallower side is closed by a stationary wall. However, the deeper side of both bins 702 and 706 is only partly closed by a stationary wall. The lower half of the steep side wall comprises a swinging floodgate, which swings up to allow fruit to fall to the next level. Bin 702 has floodgate 704 on the steep side wall, and bin 706 has floodgate 708 on the steep side wall. In addition, bin 702 rests on load cells 710 and 712.

The process control computer 302 (FIG. 3) can send instructions in the form of electrical signals to bins 702 and 706 when to open and close the respective floodgates 704 and 706, Bin floodgates 704 and 706 are operated to maintain the calculated target capacity.

The process control computer 302 calculates with the inputted fruit data and default values for all non-inputted parameters the theoretical capacity, the potable water flow, and the heavy phase flow to keep the ideal concentration to maximize the centrifuge oil recovery yield. Then, the process control computer 302, with the loop controls 408, 410 and 412 sets the machine 100 running continuously to maximize the oil recovery yield.

To keep the capacity (FIG. 4), the process control computer 302, by gathering the load cells' 710 and 712 measured weight and bucket elevator 120 speed, calculates the measured capacity and compares this value with the defined capacity 408 and increases 450 or decreases 452 the bucket elevator speed to adjust capacity.

Therefore, the machine 100 capacity calculated by the process control computer 302 is a real measured value.

Figure 8:
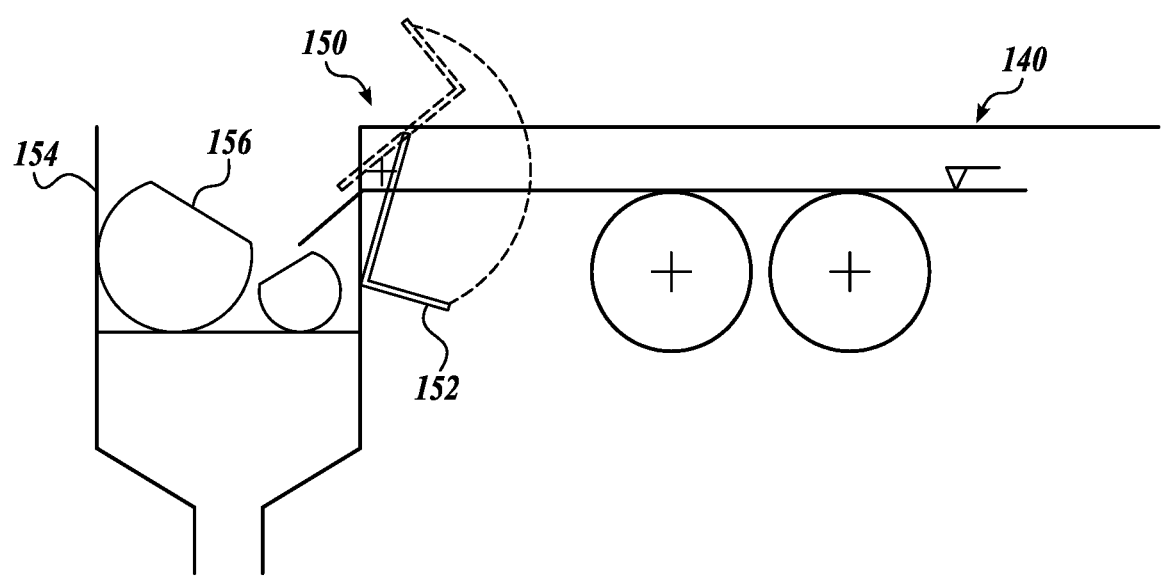
FIG. 8 is a diagrammatical illustration showing the debris removal system of the modulating oil recovery and extraction machine of FIG. 1A.

Referring to FIG. 8, a schematic illustration of the debris removal system 150 is used to explain its operation. Debris removal system 150 can be located on the end or side of the oil recovery extractor 140, at oil emulsion outlet floodgate. In the processing of fruit for the extraction of oils, it is generally inevitable that some fruits will be damaged and broken apart into pieces. The pieces will fall in between the spaces of the extraction rollers and are carried by the general flow of liquid toward the near end of the oil recovery extractor reservoir 140, at oil emulsion outlet floodgate. The debris accumulates at the end hindering the operation of the machine 100. For example, in prior art machines without the debris removal system, debris accumulates in the oil recovery reservoir 170, dirties the oil emulsion in the reservoir faster, thus, decreasing the oil recovery yield and making it necessary to stop and wash the machine 100 to improve oil recovery yield.

The debris removal system 150 has a scoop 152 generally constructed of two flat pieces connected together along the edge to make an angled scoop as seen in FIG. 8. The scoop 152 is immersed in the oil recovery extractor reservoir 140 and under the surface of the emulsion, since debris will generally float on the surface. To remove the accumulated debris, the scoop 152 rotates up and out of the emulsion, and while rotating, the scoop 152 traps the debris and lifts the debris from the oil recovery extractor reservoir 140. At a certain point in the rotation, the debris 156 slides off the scoop 152 and is deposited onto a screen in a debris collecting chute 154, and the emulsion drains leaving the debris 156 on the screen. The debris can be removed with a scraper. The debris removal system 150 can be driven automatically by process control computer 302, as shown in FIG. 3. The movement of the scoop 152 is driven automatically by the process control computer 302. However, at any time, the machine operator can add different values and can set the fruit removal frequency of the driver as is necessary or upon receiving a process request.

Figure 9:
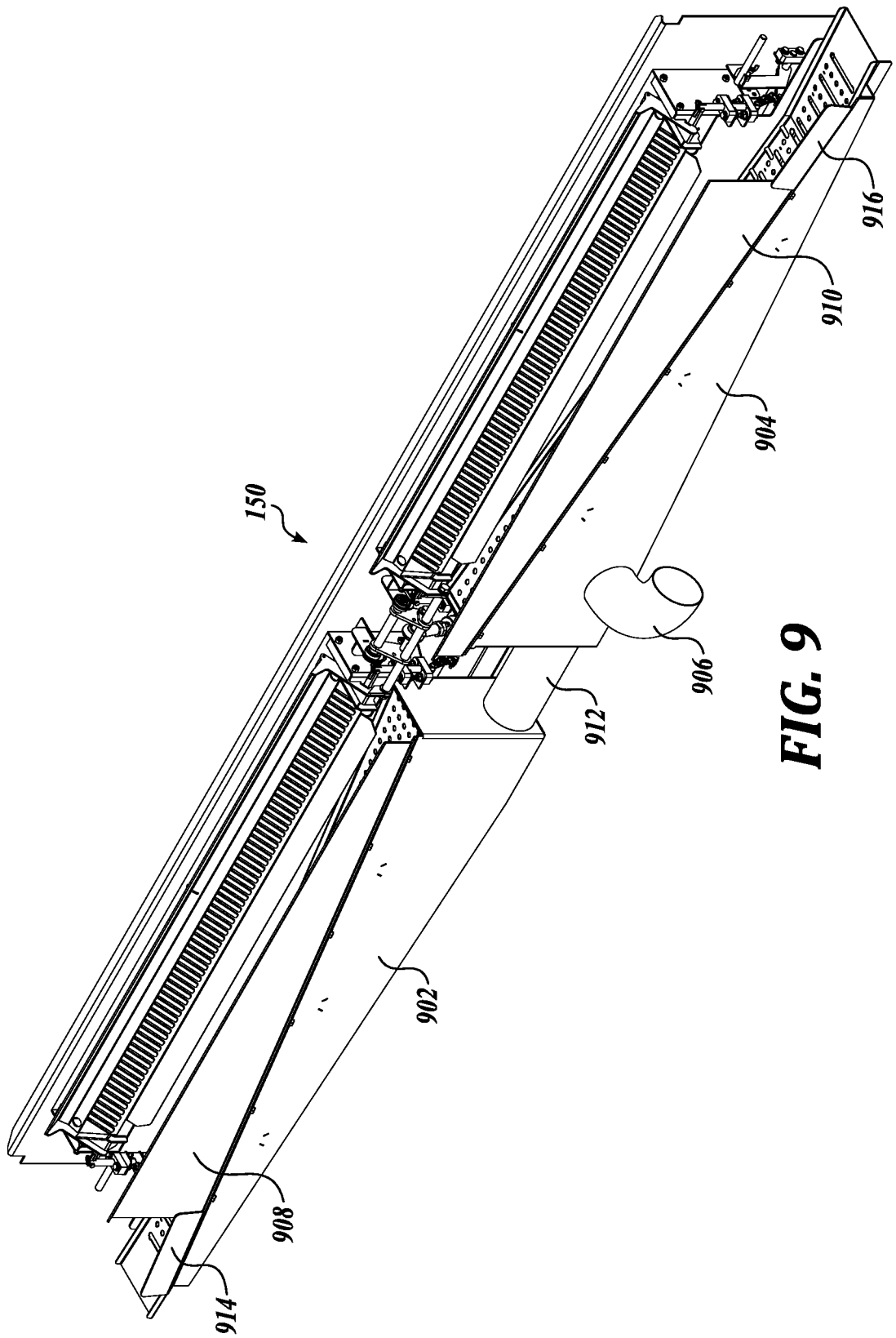
FIG. 9 is a pictorial illustration of one embodiment of the debris removal system of the modulating oil recovery and extraction machine of FIG. 1A.
Figure 10:
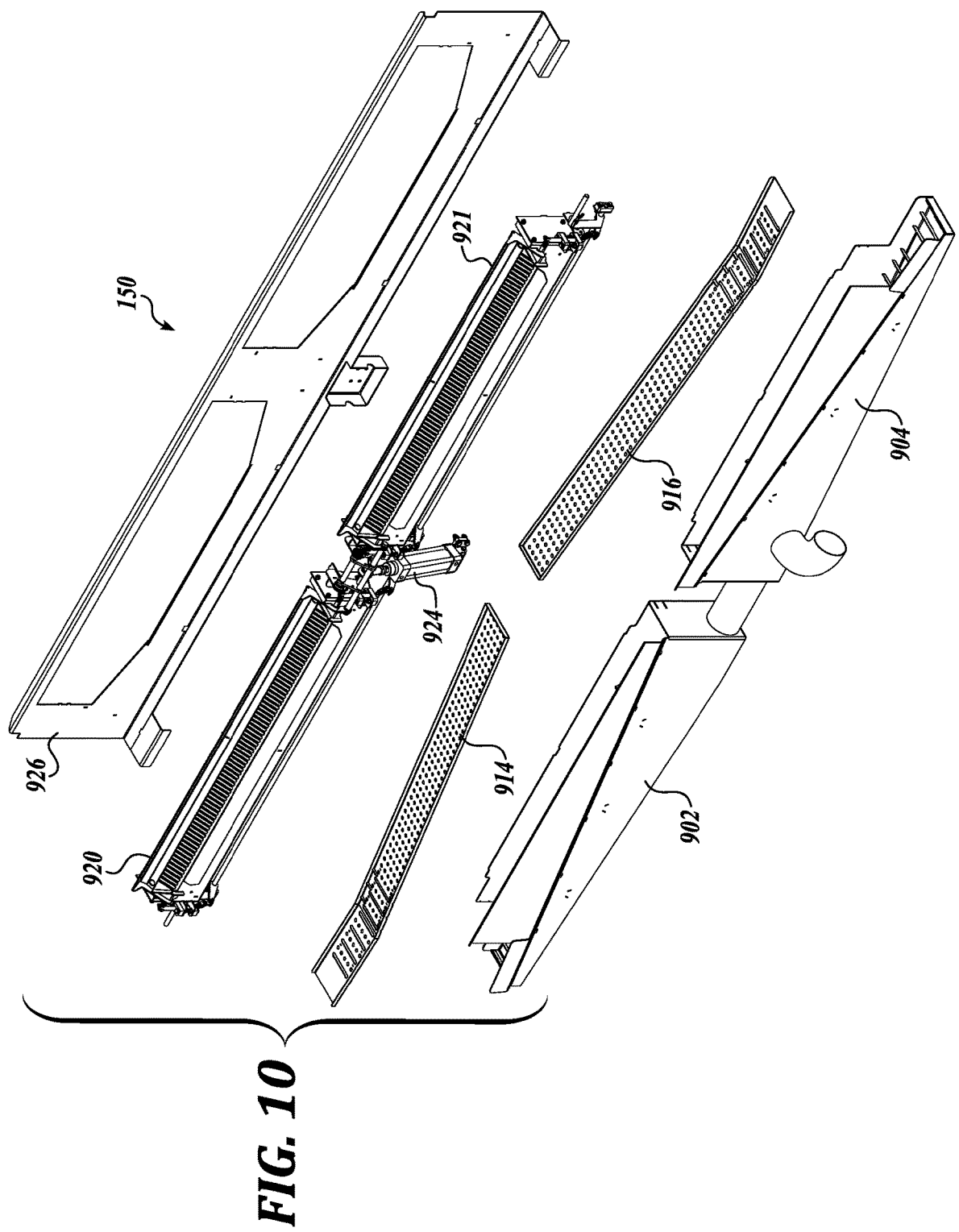
FIG. 10 is a exploded pictorial illustration of one embodiment of the debris removal system of the modulating oil recovery and extraction machine of FIG. 1A.

Referring to FIGS. 9 and 10, one embodiment of the debris removal system 150, schematically shown in FIG. 8 is shown. FIG. 9 shows the assembled debris removal system 150. Debris removal system 150 can be located on the near end of the oil recovery extractor 140, at oil emulsion outlet floodgate, below feeding and weighing outlet chute.

The debris removal system 150 includes first and second collection chutes 902 and 904. The collection chutes are connected by structural pieces, but, are also connected by a connection pipe 912 so that they share a common fluid outlet 906 for emulsion that enters the chutes 902 and 904. Each chute 902, 904 include a screen on the bottom of the chute. The screens 914, 916 slope down from the center to the outer edge, thus, creating a space below the screen that allows the oil-water emulsion to flow. A plate 908, 910 is mounted in front of each collection chutes 902, 904, respectively. The plates 908, 910 maintain the debris and emulsion within the chutes 902, 904. In this manner, the fruit debris remains on top of the screens and the oil-water emulsion passes through the screens and flows out of the outlet 906, to oil emulsion tank 170 and from this to the process.

Referring to FIG. 10, the major components of the debris removal system are shown. In FIG. 10, the screens 914 and 916 show the sloping nature from the inside to the outside more clearly. Each collection chute 902, 904 has a corresponding scoop and scraper. The scoops 920, 921 are connected with a mechanical linkage to a pneumatic cylinder 924. Upon actuation of the pneumatic cylinder 924, scoops 920, 921 rotate as described in reference to FIG. 8 to remove the fruit debris from the emulsion tank 140 and deposit the debris into the collection screens chutes 914, 916. The front plate 926, support the assembly. Although one embodiment of a debris removal system is shown and described, the invention is not limited to any particular debris removal system. The embodiment described is representative.

Next, one embodiment of the feeding and weighing system 130 is described with reference to FIGS. 11-14. A simplified drawing that is used to explain the operation of the feeding and weighing system is shown in FIG. 7.

Figure 11:
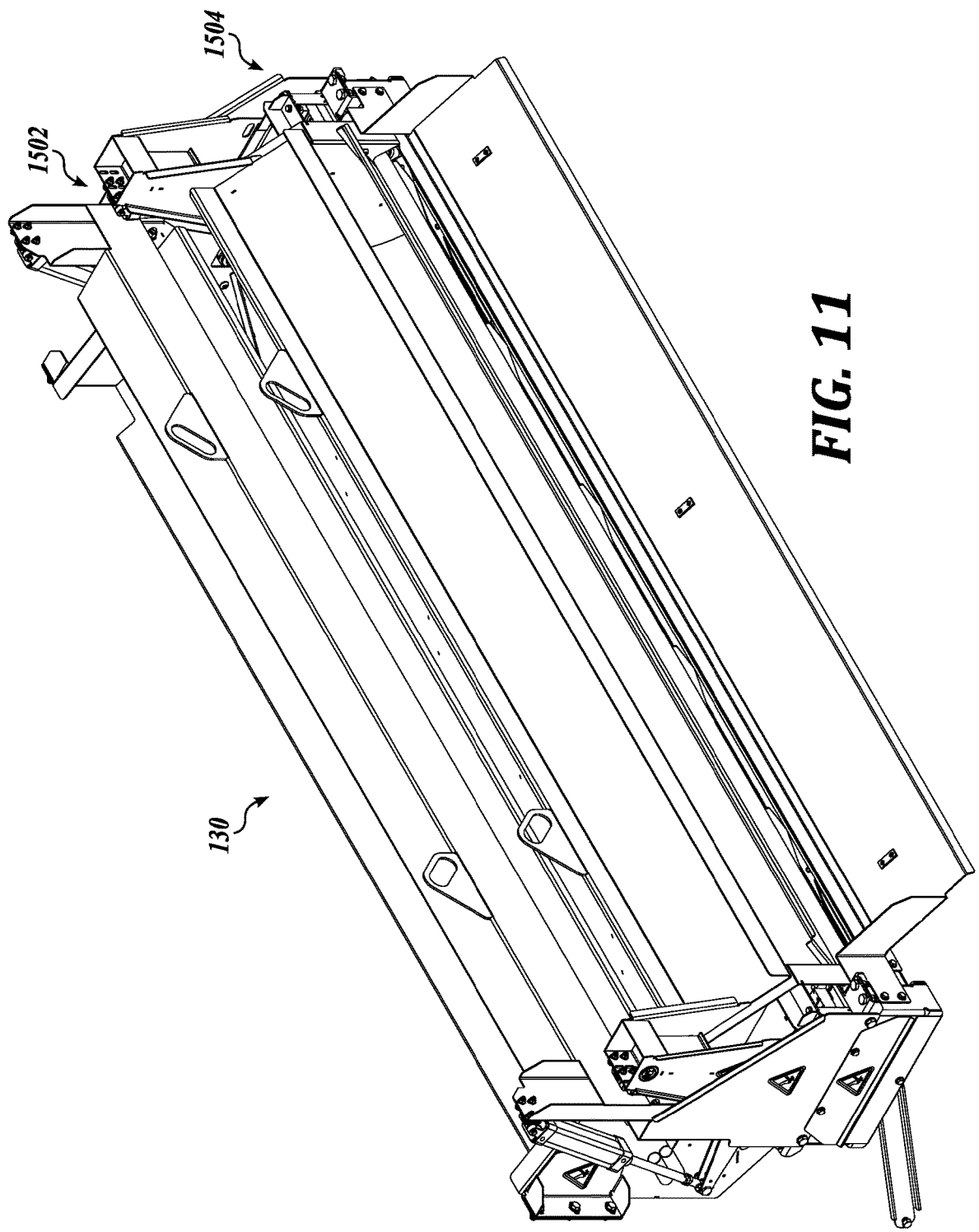
FIG. 11 is a pictorial illustration of one embodiment of the weighing and feeding system of the modulating oil recovery and extraction machine of FIG. 1A.
Figure 12:
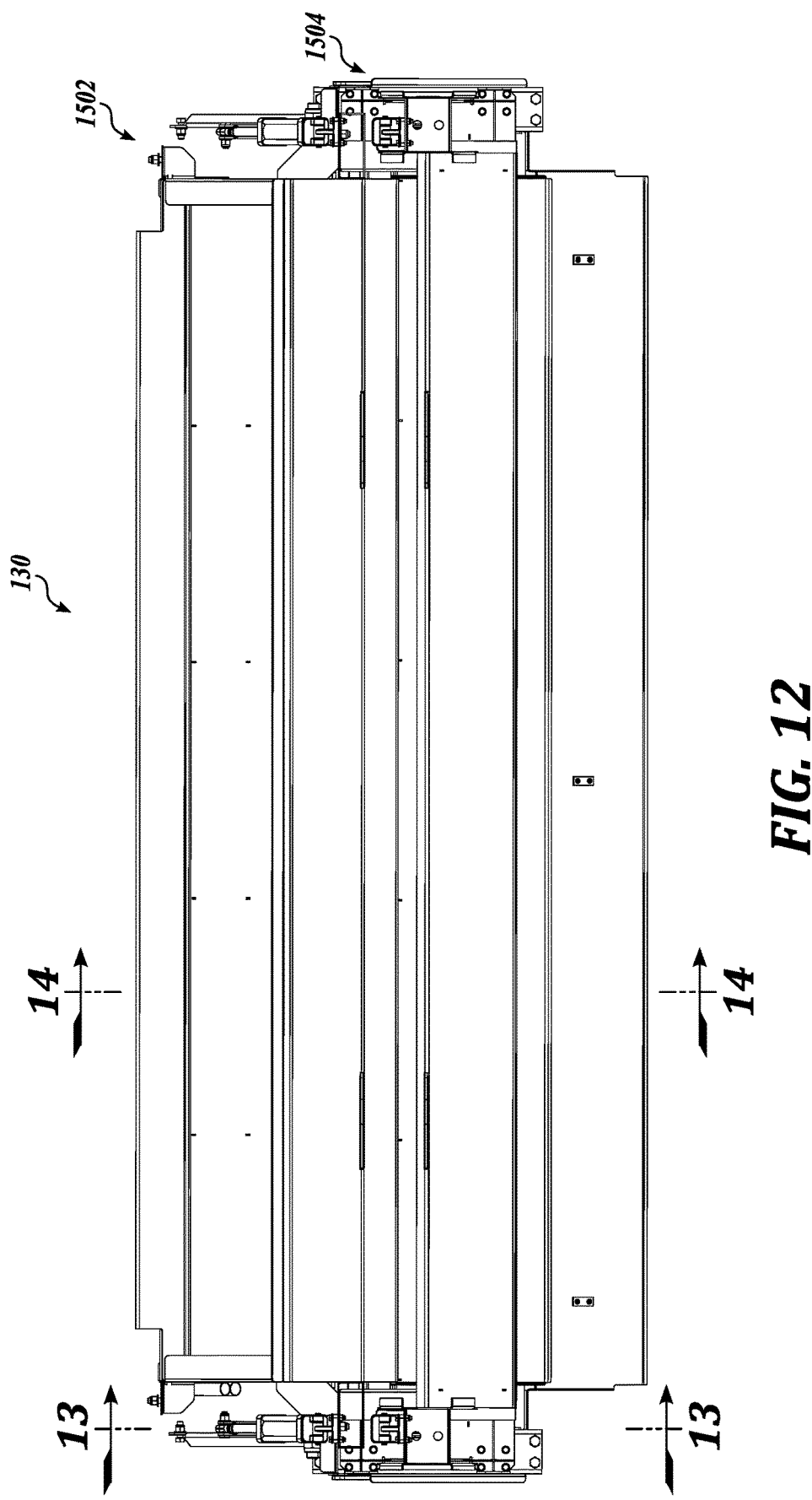
FIG. 12 is a plan view illustration of one embodiment of the weighing and feeding system of the modulating oil recovery and extraction machine of FIG. 1A.

FIG. 11 shows the first and second bins 1502 and 1504 corresponding to bins 702 and 706. The individual bins 1502 and 1504 can best be seen in the cross-sectional view of FIG. 14. Bins 1502 and 1504 are elongated to generally match the width of the oil recovery extractor 140 (FIG. 1A). Bin 1502 has a rounded wall 1512 on the receiving side, and bin 1504 has a rounded wall 1514 on the receiving side. Opposite from the rounded wall 1512, bin 1502 has a rotating floodgate 1508 that rotates around the axle 1510. Floodgate 1508 can be attached off-center on the axle 1510, meaning that floodgate 1508 has one side from the axle 1510 longer than the other side. However, the floodgate 1508 is attached to the axle 1510 so that there is enough clearance between the end of floodgate 1508 and the inside of the rounded wall 1512 as floodgate 1508 rotates. As floodgate 1508 rotates, floodgate 1508 acts as a sloping ramp to deliver fruit from bin 1502 into bin 1504.

Opposite from the rounded wall 1514 of bin 1504, bin 1504 has a rotating floodgate 1516 that rotates around the axle 1518. Floodgate 1516 can be attached off-center to the axle 1518, meaning that floodgate 1516 has one side from the axle 1518 longer than the other side. However, the floodgate 1516 is attached to the axle 1518 so that there is enough clearance between the end of floodgate 1516 and the inside of the rounded wall 1514 as floodgate 1516 rotates. As floodgate 1516 rotates, floodgate 1516 acts as a sloping ramp to deliver fruit from bin 1504 into the oil recovery extractor 140 through the chute 1524.

Figure 13:
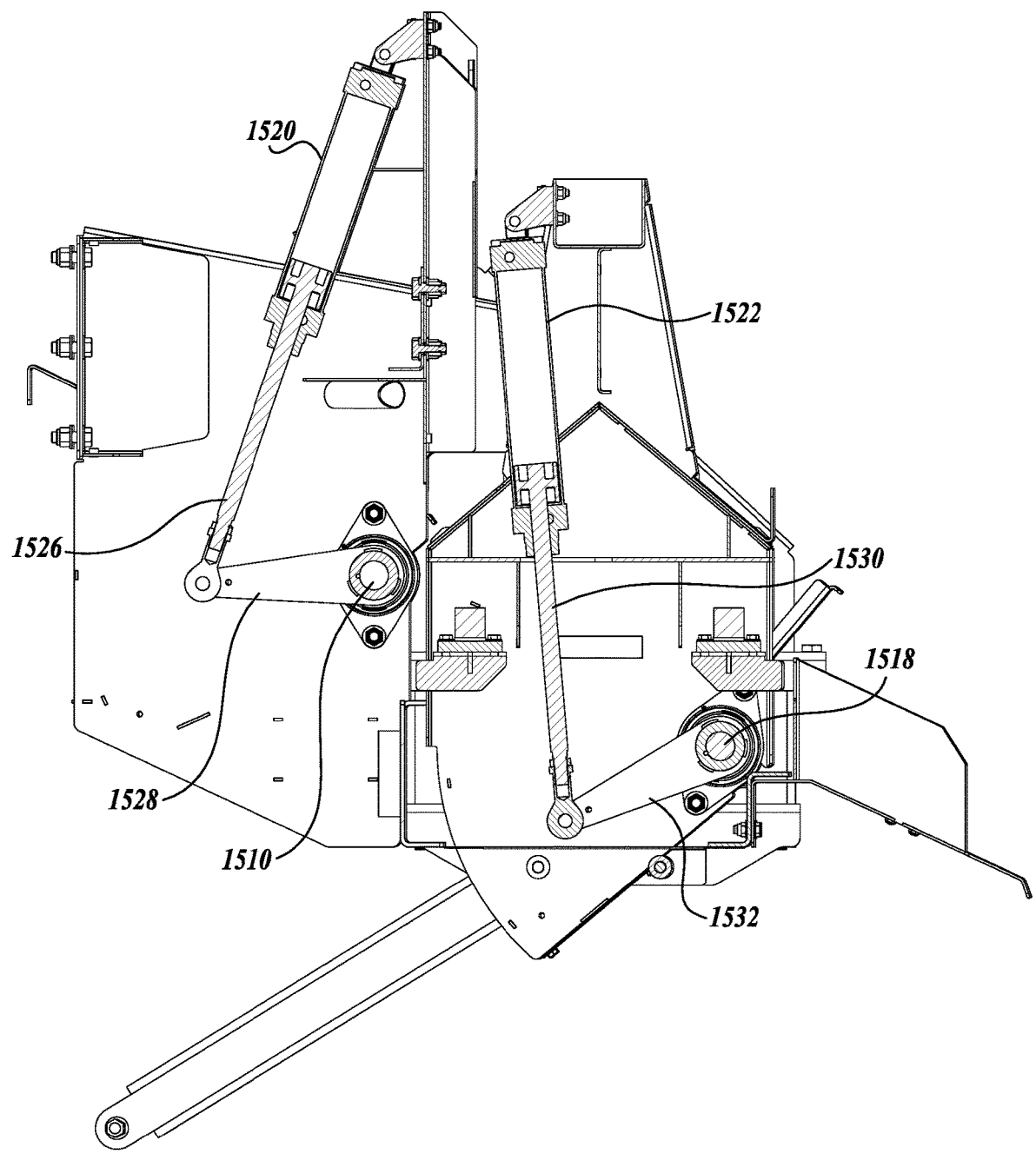
FIG. 13 is a cross-sectional view of one embodiment of the weighing and feeding system of the modulating oil recovery and extraction machine of FIG. 1 taken along lines 13-13 of FIG. 12.
Figure 14:
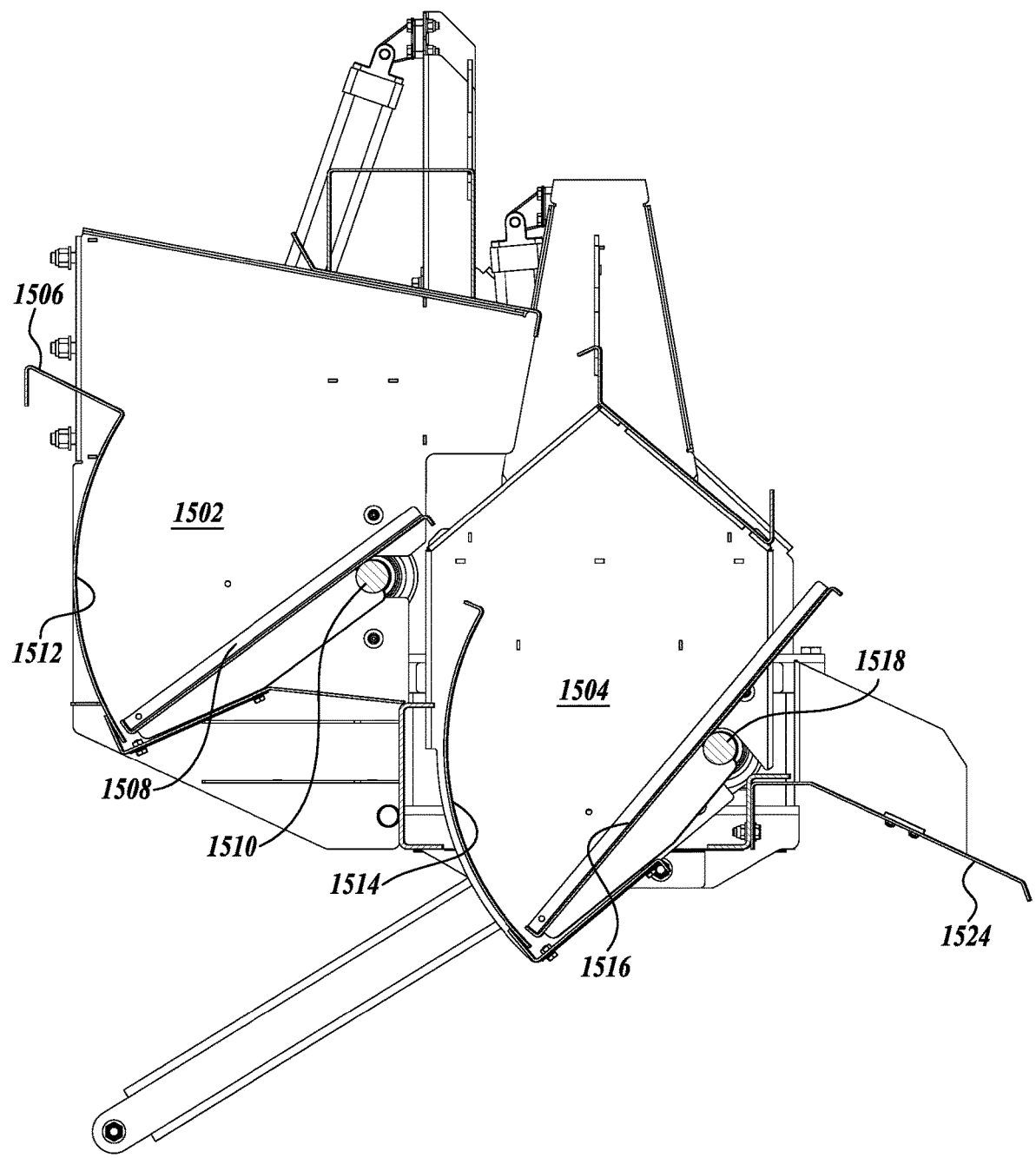
FIG. 14 is a cross-sectional view of an embodiment of the weighing and feeding system of the modulating oil recovery and extraction machine of FIG. 1A, taken along line 14-14 of FIG. 12.

Referring to FIG. 13, it is seen that bin floodgate 1508 is driven by pneumatic cylinders 1520 retracting and extending the shaft 1526 which is connected to the axle 1510 via the lever 1528. In a similar fashion, bin floodgate 1516 is driven by pneumatic cylinders 1522 retracting and extending the shaft 1530 which is connected to the axle 1518 via the lever 1532.

Bin 1504 is further resting on load cells (not shown) that can be calibrated to provide the net weight of fruit within the bin 1504. The bin 1504 is isolated from other supporting structures so as to provide an accurate weight of fruit in the bin 1504. As seen in FIG. 3, the weighing and feeding system is controlled by the process control computer 302. For example, process control computer 302 can send instructions to the feeding and weighing system 130 for opening and closing the floodgates 1508 and 1516 and can receive information from the load cells of bin 1504 for use in verifying the capacity.

In an embodiment, an oil extraction system 100, comprises, a feeding and weighing system 130 configured to weigh and feed fruit to an oil recovery extractor 140; the oil recovery extractor comprises a plurality of extraction rollers 502, 504, 506 inside an oil recovery extractor 140 reservoir, wherein the extraction rollers perforate fruit peel oil cells under water or a heavy phase to drain oil from the oil cells; and a fruit washing system 160 configured to spray the fruit with potable water to wash oil remaining on the perforated fruit peel after the fruit has left the oil recovery extractor and collect the oil; wherein an oil-water emulsion 144 from the oil recovery extractor and an oil-water emulsion 164 from the fruit washing system are combined into an oil-emulsion inside an oil emulsion tank 170 to produce an oil-water emulsion product 172 having an oil percent that is an ideal concentration to maximize the oil recovery yield in a centrifuge; and a process control system 300 configured to control the capacity according to fruit conditions and default values for non-inputted parameters or according to production request and to measure and control one or more operational parameters of the machine including calculating a setpoint feed flow of the fruit, then measuring and controlling the feed flow 132 of fruit based on the setpoint or according to production necessity.

In an embodiment, the process control system 300 is further configured to calculate operational parameters that produce an oil-emulsion product having an oil percent that is an ideal concentration to maximize the oil recovery yield of the centrifuge.

In an embodiment, the process control system 300 is configured to maximize oil recovery yield and control the capacity.

In an embodiment, the process control system 300 is configured to recalculate the operational parameters repetitively.

In an embodiment, the process control system 300 is configured to increase the feed flow 132 to the machine when the feed flow to the machine is equal to or less than the setpoint feed flow.

In an embodiment, the oil extractor machine 100 receives a heavy phase 142 of an oil-water emulsion from a separator, such as a centrifuge, and the process control system 300 is configured to further calculate a setpoint of the heavy phase flow to the oil recovery extractor 140.

In an embodiment, the process control system 300 is configured to increase the heavy phase flow 142 to oil extractor machine 100 when the flow of heavy phase is equal to or less than the setpoint flow of the heavy phase.

In an embodiment, the fruit washing system 160 receives potable water 162, and the process control system 300 is configured to further calculate a setpoint of the potable water flow to the fruit washing system.

In an embodiment, the process control system 300 is configured to increase the flow of the potable water 162 to the fruit washing system 160 when the flow of potable water to the fruit washing system is equal to or less than the setpoint flow of the potable water.

In an embodiment, the oil extraction system 100 comprises extraction rollers 502, 504, 506 located inside the oil recovery extractor 140 reservoir, wherein the extraction rollers are configured to rotate at a rotational speed around a longitudinal axis while reciprocating back and forth at an axial speed along the longitudinal axis.

In an embodiment, the process control system 300 is configured to calculate the rotational speed and the axial speed of the extraction rollers 502, 504, 506 based on at least fruit physical parameters.

In an embodiment, the extraction rollers 502, 504, 506 are grouped into modules and each module comprises more than one extraction roller operating at a different rotational speed than the other extraction rollers in the same module.

In an embodiment, the extraction rollers 502, 504, 506 of each module are assigned a position, and the extraction rollers at the same position of each module operate at the same rotational speed.

In an embodiment, the axial speed of each extraction roller 502, 504, 506 is the same.

In an embodiment, the process control system 300 comprises a memory 306 having look-up tables to calculate the setpoints for the operational parameters.

In an embodiment, the oil extraction system 100 further comprises a debris removal system 150 having a rotating scoop 152 configured to remove fruit debris from the oil extractor 140 reservoir.

In an embodiment, the feeding and weighing system 130 includes a first bin 702 having a first rotating floodgate 704 to feed fruit to a second bin 706, wherein the second bin has a second rotating floodgate 708 to feed fruit to the oil recovery extractor 140, and the second bin has a load cells 710, 712 to measure weight of fruit in the second bin, wherein the process control system 300 is configured to receive the weight from the second bin and open and close the floodgates.

In an embodiment, a method 400 for extracting oil from fruit, comprises, calculating values 404 of one or more operational parameters of an oil extraction system, the machine comprising: a feeding and weighing system 130 configured to weigh and feed fruit to an oil recovery extractor 140 on a weight per time basis; the oil recovery extractor 140 comprises a plurality of extraction rollers 502, 504, 506 that perforate fruit peel oil cells under water or heavy phase to drain oil from the oil cells inside the oil recovery extractor reservoir; and a fruit washing system 160 configured to spray the fruit with potable to wash oil remaining on perforated fruit peel after the fruit has left the oil recovery extractor and to collect the oil-water emulsion; wherein an oil-water emulsion 144 from the oil recovery extractor and an oil-water emulsion 164 from the fruit washing system are combined into an oil-emulsion inside an oil emulsion tank 170 to produce an oil-water emulsion 172 having an oil percent that is an ideal concentration to maximize oil recovery yield of a centrifuge or according to production necessity; and measuring one or more operational parameters 132, 142, 162 of the machine, and controlling the one or more operational parameters based on the calculated values.

In an embodiment, the method 400 further comprises calculating the fruit feed flow 408 to the machine, and controlling the fruit feed flow and based on the calculated value, calculating potable water flow 412 and heavy-phase flow 410 to keep the emulsion at the ideal concentration to maximize the centrifuge oil recovery yield.

In an embodiment, the method 400 further comprises calculating 404 a rotational speed and axial speed of extraction rollers that perforate the fruit peel oil cells to allow oil to flow out from the surface into the oil recovery extractor reservoir.

In an embodiment, the method 400 further comprises calculating a flow of a heavy phase oil-water emulsion 410 to the emulsion tank and measuring and controlling the flow of the heavy phase oil-water emulsion based on the calculated flow of heavy phase oil-water emulsion.

In an embodiment, the method further comprises calculating a potable water flow 412 to the washing system to wash oil remaining on the fruit after the fruit passes from the emulsion tank and measuring and controlling the flow of potable water to the washing system based on the calculated potable water flow.

In an embodiment, the process control system is further configured to calculate operational parameters 414 that produce an oil-emulsion with an oil percent that is the ideal concentration to maximize oil recovery yield of the centrifuge or according to production necessity.

In an embodiment, the operational parameters are calculated repetitively on a process control computer 302.

In an embodiment, the process control computer 302 includes a theoretic curve that provide the calculated values of feed flow, heavy phase flow, and potable water flow.

While illustrative embodiments have been illustrated and described, it will be appreciated that various changes can be made therein without departing from the spirit and scope of the invention.

The embodiments of the invention in which an exclusive property or privilege is claimed are defined as follows:

1. An oil extraction system, comprising:
   a feeding and weighing system configured to weigh and feed fruit to an oil recovery extractor;
   the oil recovery extractor comprises a plurality of extraction rollers inside an oil recovery extractor reservoir, wherein the extraction rollers perforate fruit peel oil cells under water or a heavy phase to drain oil from the oil cells; and
   a fruit washing system configured to spray the fruit with water to wash oil remaining on the perforated fruit peel after the fruit has left the oil recovery extractor and collect the oil;
   wherein an oil-water emulsion from the oil recovery extractor and an oil-water emulsion from the fruit washing system are combined into an oil-emulsion inside an oil emulsion tank to produce a product having an oil percent that is an ideal concentration to maximize the oil recovery yield in a centrifuge; and
   a process control system including a computer configured to perform steps, including:
   calculating a theoretical capacity using at least fruit data based on testing and a default value for oil recovery;
   measuring a weight of feed;
   comparing the theoretical capacity to the measured weight;
   increase or decrease a rate of feed to the oil extraction system to maintain the ideal concentration of oil in water; and
   re-calculating operating parameters, including a theoretical water flow to the extraction system, a theoretical heavy phase flow to the extraction system, and the theoretical capacity, based on inputting changed physical parameters of the incoming feed fruit including content of oil or dimensions, wherein re-calculating the operating parameters maintains the ideal concentration of oil in the product of the extraction system, wherein the theoretical water flow, the theoretical heavy phase flow, and the theoretical capacity are modeled by one or more curves particular to the extraction system.

2. The oil extraction system of claim 1, wherein the process control system is further configured to calculate operational parameters that produce an oil-emulsion product having an oil percent that is an ideal concentration to maximize the oil recovery yield of the centrifuge.

3. The oil extraction system of claim 1, wherein the process control system is configured to maximize oil recover yield and control the capacity.

4. The oil extraction system of claim 1, wherein the process control system is configured to increase the feed flow to the machine when the feed flow to the machine is equal to or less than the setpoint feed flow.

5. The oil extraction system of claim 1, wherein the oil extractor machine receives a heavy phase of an oil-water emulsion from a separator, and the process control system is configured to further calculate a setpoint of the heavy phase flow to the emulsion tank.

6. The oil extraction system of claim 5, wherein the process control system is configured to increase the heavy phase flow to oil extractor machine when the flow of heavy phase is equal to or less than the setpoint flow of the heavy phase.

7. The oil extraction system of claim 1, wherein the fruit washing system receives water, and the process control system is configured to further calculate a setpoint of the water flow to the fruit washing system.

8. The oil extraction system of claim 7, wherein the process control system is configured to increase the flow of the water to the fruit washing system when the flow of water to the fruit washing system is equal to or less than the setpoint flow of the water.

9. The oil extraction system of claim 1, comprising extraction rollers located inside the oil recover extractor reservoir, wherein the extraction rollers are configured to rotate at a rotational speed around a longitudinal axis while reciprocating back and forth at an axial speed along the longitudinal axis.

10. The oil extraction system of claim 9, wherein the process control system is configured to calculate the rotational speed and the axial speed of the extraction rollers based on at least fruit physical parameters.

11. The oil extraction system of claim 9, wherein the extraction rollers are grouped into modules and each module comprises more than one extraction roller operating at a different rotational speed than the other extraction rollers in the same module.

12. The oil extraction system of claim 11, wherein the extraction rollers of each module are assigned a position, and the extraction rollers at the same position of each module operate at the same rotational speed.

13. The oil extraction system of claim 9, wherein the axial speed of each extraction roller is the same.

14. The oil extraction system of claim 1, wherein the process control system comprises a memory having look-up tables to calculate the setpoints for the operational parameters.

15. The oil extraction system of claim 1, further comprising a debris removal system having a rotating scoop configured to remove fruit debris from the oil extractor reservoir.

16. The oil extraction system of claim 1, wherein the feeding and weighing system includes a first bin having a first rotating floodgate to feed fruit to a second bin, wherein the second bin has a second rotating floodgate to feed fruit to the oil recover extractor, and the second bin has a load cells to measure weight of fruit in the second bin, wherein the process control system is configured to receive the weight from the second bin and open and close the floodgates.

17. A method for extracting oil from fruit, comprising:
   calculating values of one or more operational parameters of an oil extraction system, the machine comprising:
   a feeding and weighing system configured to weigh and feed fruit to an oil recovery extractor on a weight per time basis;
   the oil recovery extractor comprises a plurality of extraction rollers that perforate fruit peel oil cells under water or heavy phase to drain oil from the oil cells inside the oil recovery extractor reservoir; and
   a fruit washing system configured to spray the fruit with to wash oil remaining on perforated fruit peel after the fruit has left the oil recover extractor and to collect the oil-water emulsion;
   wherein an oil-water emulsion from the oil recovery extractor and an oil-water emulsion from the fruit washing system are combined into an oil-emulsion inside an oil emulsion tank to produce an oil percent that is an ideal concentration to maximize oil recovery yield of a centrifuge or according to production necessity; and
   calculating a theoretical capacity using at least fruit data based on testing and a default value for oil recovery;
   measuring a weight of feed;
   comparing the theoretical capacity to the measured weight; and
   increasing or decreasing a rate of feed to the oil extraction system to maintain the ideal concentration of oil in water; and
   re-calculating operating parameters, including a theoretical water flow to the extraction system, a theoretical heavy phase flow to the extraction system, and the theoretical capacity, based on inputting changed physical parameters of the incoming feed fruit including content of oil or dimensions, wherein re-calculating the operating parameters maintains the ideal concentration of oil in the product of the extraction system, wherein the theoretical water flow, the theoretical heavy phase flow, and the theoretical capacity are modeled by one or more curves particular to the extraction system.

18. The method of claim 17, further comprising calculating a rotational speed and axial speed of extraction rollers that perforate the fruit peel oil cells to allow oil to flow out from the surface into the oil recover extractor reservoir.

19. The method of claim 17, further comprising calculating a water flow to the washing system to wash oil remaining on the fruit after the fruit passes from the emulsion tank and measuring and controlling the flow of water to the washing system based on the calculated water flow.

20. The method of claim 17, wherein the process control system is further configured to calculate operational parameters that produce an oil-emulsion with an oil percent that is the ideal concentration to maximize oil recovery yield of the centrifuge or according to production necessity.

* * * * *